C. CROOK.

HARVESTER.

No. 6,798. Reissued Dec. 14, 1875.

Witnesses:
Donn Twitchell.
Hill A. Dodge

Inventor:
C. Crook.
by Dodger & Son
Attys.

N. PETERS, PHOTO-LITHOGRAPHER, WASHINGTON, D. C.

UNITED STATES PATENT OFFICE.

CHARLES CROOK, OF NEW HOPE, PENNSYLVANIA, ASSIGNOR, BY MESNE ASSIGNMENTS, TO JAMES I. HENDRYX.

IMPROVEMENT IN HARVESTERS.

Specification forming part of Letters Patent No. 17,205, dated May 5, 1857; reissue No. 548, dated May 4, 1858; reissue No. 3,393, dated April 20, 1869; extended seven years; reissue No. 5,429, dated May 27, 1873; reissue No. 6,798, dated December 14, 1875; application filed September 20, 1875.

DIVISION B.

*To all whom it may concern:*

Be it known that I, CHARLES CROOK, of New Hope, in the county of Bucks and State of Pennsylvania, have invented certain new and useful Improvements in Harvesters; and I do hereby declare that the following is a full, clear, and exact description thereof, reference being had to the accompanying drawings, making a part of this specification, and to the letters of reference marked thereon, like letters indicating like parts wherever they occur.

To enable others skilled in the art to construct and use my invention I will proceed to describe it.

This invention relates to that class of machines known as combined reapers and mowers, the invention having reference to those features which are used when the machine is operated as a harvester or reaper for cutting grain; and the invention consists in a novel method of hinging the platform, with its cutting apparatus, to the main frame, and also in devices for adjusting and sustaining the cutting apparatus and platform at different heights, as hereinafter more fully described.

Figure 1:
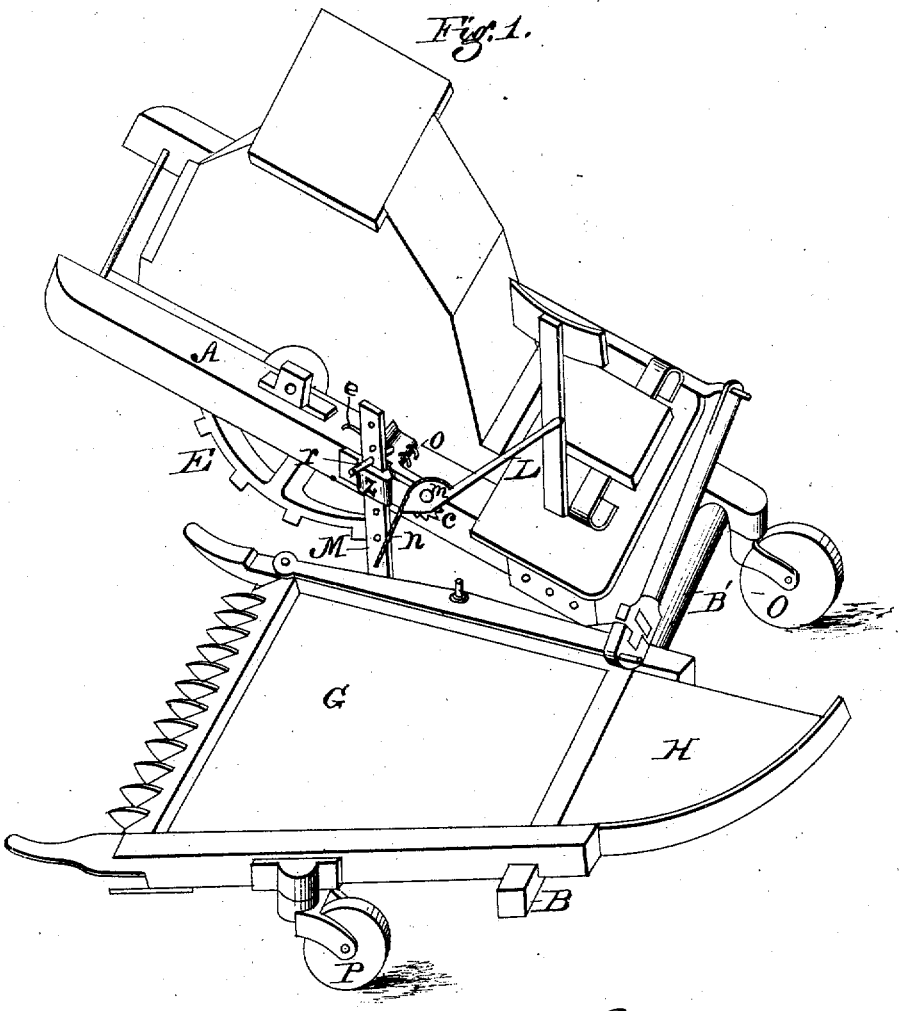
Figure 2:
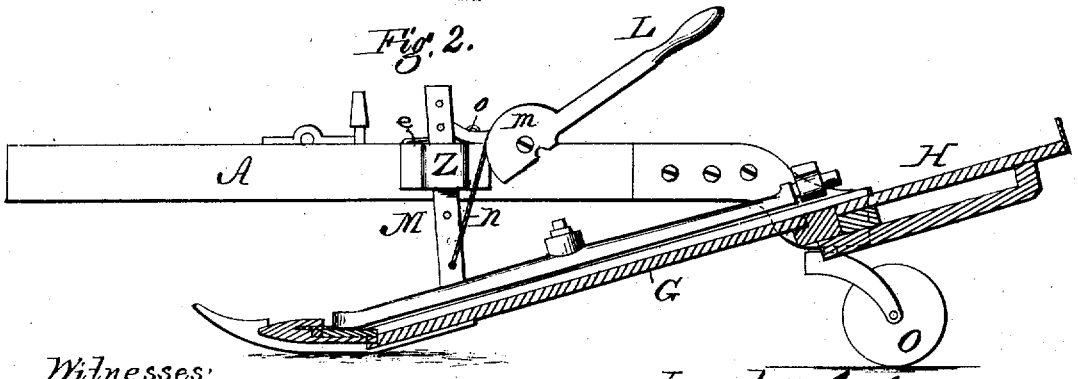

Figure 1 is a perspective view of the machine. Fig. 2 is a side elevation of the main frame, with the platform shown in section.

The main frame A is of proper size and form to contain the driving-wheel E, and the gearing connected therewith for operating the sickle, the rear end being supported by a caster-wheel, O, as represented in Fig. 1. To the rear end of the main frame the cutter-frame is connected by a hinge-joint composed of a bar, B′, which extends laterally from the inner side of the cutter-frame, and is journaled in brackets or suitable bearings secured to the main frame, thereby permitting the front end of the cutter-frame, with its sickle, to be raised or lowered at will. The platform proper, in this case, consists of two detachable parts, G and H, which, for convenience in converting the machine from a mower to a harvester, and vice versa, are secured to the cutter-frame in such a manner that they can be readily attached to or detached therefrom, thereby permitting the same cutter-frame and driving mechanism to be used both when the machine is used as a mower and as a harvester. The platform is so constructed as to deliver the cut grain at its side in rear of the main frame, as shown in Fig. 1, and it is hinged to the main frame in rear of the drive-wheel, and in such a manner that while its front end may be elevated to cut the grain at any desired height, or to pass obstructions, its rear end will not be depressed sufficiently to hit the ground or interfere with the operation of the machine. In order to adjust the cutter-frame, and to hold it suspended at the various heights required, and at the same time provide for raising it still higher when necessary for passing obstructions, or for any other purpose, I pivot upon the main frame A a lifting-lever, L, provided at its lower end with a segment, *c*, having ratchet-teeth thereon or secured thereto, as shown in Fig. 1, a cord or chain, *n*, serving to connect the lever with the cutter-frame, so that by depressing the rear end of the lever the cutter-frame may be raised at its front end whenever desired, there being a pawl, O, pivoted to the main frame in such a manner as to engage with the teeth of the ratchet and lock the lever, thus preventing the cutter-frame from dropping down when the lever is released. The pawl O has its rear end weighted, or made heavier than its point, which engages with the ratchet, and has a spring, *e*, arranged under it in such a manner as to press the point into contact with the ratchet, and so that the operator, by pressing on its free or weighted end, can disconnect it from the ratchet whenever desired; or by turning the end of this spring from under the pawl its weighted end will drop down, thereby disconnecting it entirely from the ratchet, thus leaving the lever free to be moved in either direction, and thereby to raise or lower the cutter-frame, with its cutting apparatus and the platform, at will. This part of the apparatus may be termed the lifting device, and it is used on the machine both when the latter is used as a reaper and also when used as a mower—in the former case to elevate or adjust the platform and cutting apparatus, and in the latter case to raise the sickle to pass obstructions, and also to hold it clear of the ground when the mower is not in use, or is being moved to or from its work. In addition to this lifting device there is provided a separate suspending device for sustaining the front end of the platform and the cutting apparatus at the desired height while cutting grain, this suspending device being so constructed that it will hold the sickle and platform at any height to which they may be adjusted or set, and at the same time leave them free to rise when necessary to pass obstructions, and fall again to their previously adjusted position. This suspending device, as shown in Figs. 1 and 2, may consist of a bar, M, connected by a loose joint to the cutter-frame, and extending up through a staple or plate, Z, secured to the side of the main frame, it being provided with a series of holes for the insertion of a pin, *r*, as represented in Fig. 1, by which the cutting apparatus and platform may be secured at any desired height, and permitted to rise above, but not to fall below, the point at which they may have been thus set or adjusted, the bar M playing freely up and down through the staple until arrested in its downward movement by the pin.

The operation of these parts is as follows: When it is desired to set or adjust the cutting apparatus to cut the grain at any desired height, it is raised by means of the lifting device to the required height, the lever L being locked by the pawl O, thus holding the platform temporarily until the pin *r* is inserted in the proper hole, after which the pawl may be disconnected from the ratchet, leaving the latter free; or the lever may be turned over forward far enough to leave the connecting or lifting cord or chain *n* slack, and be held in that position by the pawl. As this cord or chain *n* is flexible it will be seen that the platform and sickle may play up and down by the dropping of the driving-wheel E into a hollow, or by the front end of the cutter-frame striking and passing over a hillock without at all affecting the lever, and that during the operation of cutting grain the cutting apparatus and front end of the platform are suspended and held entirely by the suspending device, independent of the lever or lifting device. At the same time the platform and sickle can be elevated by the lifting device whenever necessary, to pass obstructions, to readjust their height, or for any purpose that may be necessary.

The suspending device is to be used only when the machine is used as a harvester, as when used as a mower the cutting apparatus is allowed to float free on the ground, the suspending device in that case being disconnected from the main frame, or the pin removed, so as to leave the sickle free to play up and down, so as to follow the undulations of the surface of the ground.

I am aware that harvesters have been described as made with a frame balanced on the axle of the driving-wheel, with a cutter-frame attached in rear of said frame by a joint which permitted the cutter-frame to be set and held rigidly at different heights and inclinations, as in the patent of E. B. Forbush, dated March 18, 1856; also, that in the patent of G. Esterly, March 24, 1857, there is shown a main frame and cutter-frame, made all in one, and balanced on the axle of the driving-wheel, with its front made adjustable in reference to a reach supported at its front on a truck; and also that in the patent of W. P. Wood, dated September 23, 1856, there is shown a main frame supported at its front on a truck, with a cutter-frame extending underneath the main frame, and suspended therefrom by rods at a point close to the axle, and within the periphery of the driving-wheel, with its front end suspended by a rigid brace connected directly to the lifting-lever, and therefore I do not claim the construction shown in either of said patents.

The lifting device is not claimed in this application as a separate and distinct device, the same being claimed in another patent; but,

Having thus fully described the invention which constitutes the distinguishing features of this application, what is herein claimed is—

1. The combination, in a harvester, of a main frame, supported on a driving-wheel, without any front truck, and a separate cutter-frame loosely jointed thereto in rear of the driving-wheel, and being located or arranged wholly outside of the main frame, substantially as described.

2. In combination with a cutter-frame, located outside of the main frame, and hinged loosely thereto in rear of the driving-wheel, a lever pivoted to the main frame, and connected to the cutter-frame, substantially as described, whereby the front end of the latter can be raised or lowered at will, as set forth.

3. The combination of a main frame, a hinged adjustable cutter-frame, an independent suspending device for suspending said cutter-frame, and a lifting device having a flexible connection to the platform, substantially as described.

4. In combination with a main frame and an adjustable cutter-frame, a suspending device independent of the lifting device, constructed to operate substantially as described, whereby the cutter-frame may be adjusted and held at any desired height, and be free to rise above and fall to its adjusted position without affecting the lifting device, as set forth.

CHAS. CROOK.

Attest:

ALEX. B. JOHNSON,
S. S. JOHNSON.